July 28, 1925.
C. R. ENDICOTT
PRINTER'S QUOIN
Filed March 6, 1923
1,547,573
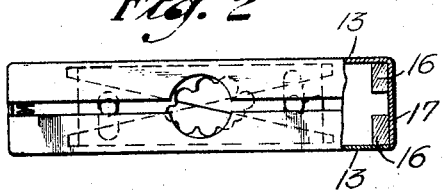
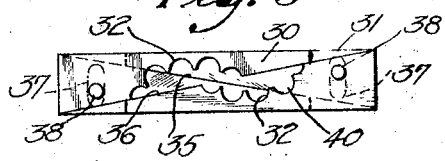
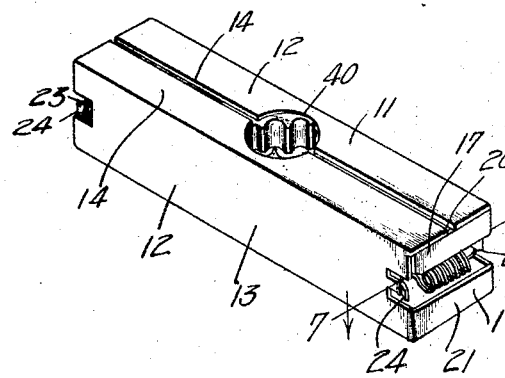
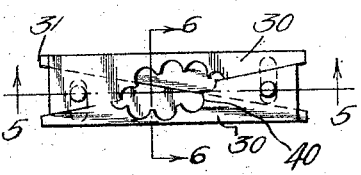
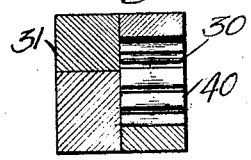
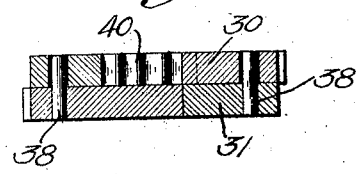
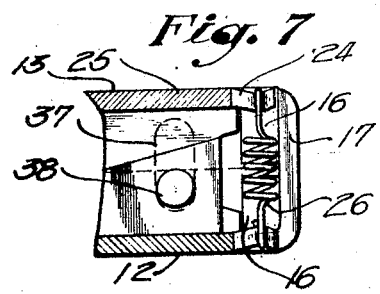
INVENTOR
CHESTER R. ENDICOTT
BY
*Graham & Lewis*
ATTORNEYS Patented July 28, 1925.

1,547,573

UNITED STATES PATENT OFFICE.

CHESTER R. ENDICOTT, OF EAGLE ROCK, CALIFORNIA.

PRINTER'S QUOIN.

Application filed March 6, 1923. Serial No. 623,199.

*To all whom it may concern:*

Be it known that I, CHESTER R. ENDICOTT, a citizen of the United States, residing at Eagle Rock, in the county of Los Angeles and State of California, have invented a new and useful Printer's Quoin, of which the following is a specification.

This invention relates to the art of printing and is more particularly an improved form of quoin employed for locking type in a chase or form. There are at the present time in use in the printing art several types of quoins, among these being the original type of quoin consisting of two wedge members which are moved longitudinally relative to each other so as to provide the desired wedging action, and the cam operated quoin which consists of a pair of plate members between which a spiral cam is placed by which the plates are forced apart when the cam is rotated by a key. This type of quoin is furnished with a small spring at each end which extends between projections upon the adjacent ends of the plate members. These springs are exposed and therefore are often knocked off from the plate members allowing these plate members to become separated.

The disadvantages of this type of quoin are that the expansive force of the cam is applied in the centers of the plates which causes the plates to become bent into arcuated form after being in use for but a comparatively short time, thus destroying the parallelism of the faces thereof. Another disadvantage of this type of quoin is that the springs are being continuously lost so that the parts thereof become separated. A disadvantage of the ordinary wedge quoin is that under vibration of the presses they at times become loosened and allow the type to fall from the form.

It is an object of my invention to provide a printer's quoin which will be self contained and which is so constructed that it will remain locked under the most adverse conditions, therefore eliminating losses now encountered as the result of the failure of quoins to remain securely locked.

It is a further object of the invention to provide a quoin having an expansible casing which is held resiliently upon the expanding members of the quoin by spring members which are situated in recesses and therefore cannot be readily removed. This quoin presents a true rectangular prism form and is adapted to apply an even pressure throughout its entire length.

The especial advantages of the invention and further objects thereof will be made evident hereinafter.

Referring to the drawing which is for illustrative purposes only,

Fig. 1 is a perspective view of a printer's quoin embodying the features of my invention.

Fig. 2 is a partially sectioned plan view of the quoin shown in Fig. 1.

Fig. 3 is a plan view of the expanding wedge members employed in the quoin, these wedge members being shown in extended relative position.

Fig. 4 is a plan view similar to Fig. 3 but showing the wedge members brought together in expanding position.

Fig. 5 is a section taken upon a plane represented by the line 5—5 of Fig. 4.

Fig. 6 is a section taken upon a plane represented by the line 6—6 of Fig. 4.

Fig. 7 is an enlarged fragmentary sectional view taken upon a plane represented by the line 7—7 of Fig. 1.

In the form of the invention shown in the drawings, 11 represents an expansible casing comprised of a pair of members 12 which are in the form of channels having bottoms 13 which serve as the sides of the quoin and having side walls 14 which cooperate to form the top and bottom of the quoin.

As shown in Figs. 2 and 7, reinforcing blocks 16 are formed in the ends of the channels 12, and extending from one of the blocks 16 is a tongue 17 which lies over the adjacent block upon the corresponding end of the opposite channel member. These tongues 17 are arranged one at each end of each channel member in such a manner that the upper tongue as indicated at 20 in Fig. 1 extends from the right hand channel 12, while the lower tongue as indicated at 21 is formed upon the left hand member and extends over the block 16 of the right hand member. By forming the channels in this manner, it is possible to employ the same die for making both parts, as the reversal of the channel member disposes the tongues 17 in the cooperating relationship shown in the drawing. In the recesses 23 existing between the blocks 16 and the tongue 17 outwardly extending hook members 24 are formed which, as shown in Fig. 7, are bent downwardly so that they rest below the surface 25 of the side walls 13 and are connected together by spring members 25, one each of which is placed in each end of the quoin. These spring members hold the casing members 12 resiliently together and are disposed entirely within the structure so that they do not project in any way, and thereby is prevented any possibility of their becoming knocked off during the handling of the quoin.

Within the casing 11, expanding means are provided which consist of upper cooperating wedge members 30 and lower wedge members 31. The wedge members 30 are provided with interior rack formations 32 between which a quoin key may be rotated to cause the relative longitudinal movement of the wedge members from the position shown in Fig. 3 to the position shown in Fig. 4, or oppositely. The lower wedge members 31 are disposed directly below the upper wedge members 30 and are placed with the inclined or abutment faces 35 thereof disposed diagonally to the abutment faces 36 of the upper wedge members. The upper and lower wedge members 30 and 31 cooperate in filling the entire height of the recesses in the channels in which the wedge members rest and are therefore in frictional contact with the side walls 14 of the casing members 12 as well as with the bottoms thereof. Near the ends of each lower member 31 a transverse slot 37 is provided into which pins 38 extend downwardly from the upper wedge members 30. These pins provide an engagement between the wedge members which causes the movement of the lower wedge members with the upper wedge members, the slots 37 compensating for the change in the lateral position of the pins during the relative movement of the wedging members.

In Fig. 1 the quoin is shown in closed position and in Fig. 2 it is shown expanded. Semi-circular notches 40 are provided centrally in those side walls of the casing members 12 constituting the upper wall of the quoin, to provide a substantially circular opening through which a quoin key may be inserted to engage the racks 32. By providing cooperating pairs of oppositely disposed wedge members in the manner shown, a frictional engagement is provided between the wedge members, in addition to the frictional contact with the walls of the casing as hereinbefore mentioned, which serves to secure the wedge members against movement from a set position. The channel formation of the casing members 12 provides a reinforced structure which is very rigid and therefore preserves the parallelism of the sides of the quoin. It will be further noted that the expansive operation of the wedge members is substantially throughout the entire length of the casing so that severe bending strains in the casing are avoided.

I claim as my invention:

1. In a device of the character described, the combination of: a pair of wedge members having racks formed in the abutting faces thereof whereby relative movement between said wedge members may be attained by application of a key; a pair of wedge members cooperating with said first named pair of wedge members; and means operatively associated with said pairs of wedges whereby the relative longitudinal movement between one pair of wedge members causes a relative longitudinal movement between said other pair of wedge members.

2. In a device of the character described, the combination of: a pair of wedge members having racks formed in the abutting faces thereof whereby relative movement between said wedge members may be attained by application of a key; a pair of wedge members cooperating with said first named pair of wedge members, said cooperating wedge members having the engaging faces thereof disposed across the plane of the abutting faces of said first named wedge members; and means operatively associated with said pairs of wedges whereby the relative movement between one pair of wedge members causes a relative movement between said other pair of wedge members.

3. In a device of the character described, the combination of: a pair of wedge members having racks formed in the abutting faces thereof whereby relative movement between said wedge members may be attained by application of a key; a pair of wedge members cooperating with said first named pair of wedge members; means operatively associated with said pairs of wedges whereby the relative longitudinal movement between one pair of wedge members causes a relative longitudinal movement between said other pair of wedge members; and an expansible casing enclosing said wedge members, said casing having an opening therein for inserting said key to operate said wedge members.

4. In a device of the character described, the combination of: a pair of wedge members having racks formed in the abutting faces thereof whereby relative movement between said wedge members may be attained by application of a key; a pair of wedge members cooperating with said first named pair of wedge members, said cooperating wedge members having the engaging faces thereof disposed across the plane of the abutting faces of said first named wedge members; means operatively associated with said pairs of wedges whereby the relative movement between one pair of wedge members causes a relative movement between said other pair of wedge members; and an expansible casing enclosing said wedge members, said casing having an opening therein for inserting said key to operate said wedge members.

5. In a device of the character described, the combination of: a pair of wedge members having racks formed in the abutting faces thereof whereby relative movement between said wedge members may be attained by application of a key; a pair of wedge members cooperating with said first named pair of wedge members; means operatively associated with said pairs of wedges whereby the relative movement between one pair of wedge members causes a relative movement between said other pair of wedge members; and a pair of cooperating casing members placed over said wedge members and held together by resilient means, said casing members being provided with an opening through which said key may be inserted to operate said wedge members.

6. In a device of the character described, the combination of: a pair of wedge members having racks formed in the abutting faces thereof whereby relative movement between said wedge members may be attained by application of a key; a pair of wedge members cooperating with said first named pair of wedge members; said cooperating wedge members having the engaging faces thereof disposed across the plane of the abutting faces of said first named wedge members; means operatively associated with said pairs of wedges whereby the relative movement between one pair of wedge members causes a relative movement between said other pair of wedge members; and a pair of cooperating casing members placed over said wedge members and held together by resilient means, said casing members providing an opening through which said key may be inserted to operate said wedge members.

7. In a device of the character described, the combination of: a pair of cooperating wedge members; a second pair of cooperating wedge members; means whereby a relative longitudinal travel of one pair of wedge members will effect a coincident relative longitudinal travel of the other pair of wedge members; and an expansible casing enclosing all of said wedge members.

8. In a printer's quoin, the combination of: a pair of wedge members having opposed toothed portions adapted for engagement by a quoin key to effect relative longitudinal travel of said members; a second pair of wedge members positioned beside said first named pair of wedge members; both pairs of wedge members being transversely movable during their longitudinal travel to increase or decrease their effective heights; and means insuring coincident longitudinal travel of both pairs of wedge members.

9. In a printer's quoin, the combination of: a pair of wedge members having opposed toothed portions adapted for engagement by a quoin key to effect relative longitudinal travel of said members; a second pair of wedge members positioned beside said first named pair of wedge members; both pairs of wedge members being transversely movable during their longitudinal travel to increase or decrease their effective heights; means insuring coincident longitudinal travel of both pairs of wedge members; and an expansible casing enclosing both pairs of said wedge members.

In testimony whereof, I have hereunto set my hand at Los Angeles, California, this 1st day of March, 1923.

CHESTER R. ENDICOTT.